(12) United States Patent
Koeppel et al.

(10) Patent No.: US 11,900,354 B2
(45) Date of Patent: Feb. 13, 2024

(54) REMOTE COMMANDS USING NETWORK OF TRUST

(71) Applicant: CAPITAL ONE SERVICES, LLC, McLean, VA (US)

(72) Inventors: Adam R. Koeppel, Washington, DC (US); James Zarakas, Centreville, VA (US); Molly Johnson, Alexandria, VA (US); Tyler Locke, Jersey City, NJ (US); Rajko Ilincic, Annandale, VA (US); Kevan Emmott, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/961,232

(22) Filed: Oct. 6, 2022

(65) Prior Publication Data

US 2023/0031947 A1 Feb. 2, 2023

Related U.S. Application Data

(63) Continuation of application No. 16/169,768, filed on Oct. 24, 2018, now Pat. No. 11,494,757.

(51) Int. Cl.
*H04W 12/08* (2021.01)
*G06Q 20/32* (2012.01)
*G06Q 20/38* (2012.01)

(52) U.S. Cl.
CPC ..... *G06Q 20/3278* (2013.01); *G06Q 20/3224* (2013.01); *G06Q 20/382* (2013.01)

(58) Field of Classification Search
None
See application file for complete search history.

(56) References Cited

U.S. PATENT DOCUMENTS

| 5,892,900 A | 4/1999 | Ginter et al. |
| 8,700,526 B1 | 4/2014 | Cozens et al. |

(Continued)

FOREIGN PATENT DOCUMENTS

| CN | 105139194 A | 12/2015 |
| EP | 2897094 A1 | 7/2015 |

OTHER PUBLICATIONS

Hansen, "Extending Mesh Networks to Opportunistic Resource Sharing", 2012 Sixth International Conference on Innovative Mobile and Internet Services in Ubiquitous Computing, pp. 224-230, (2012).

(Continued)

*Primary Examiner* — Patrick McAtee
*Assistant Examiner* — Nakia Leffall-Allen
(74) *Attorney, Agent, or Firm* — DLA Piper LLP US

(57) ABSTRACT

A device may include a processor, a wireless transceiver in communication with the processor, and a non-transitory memory. The memory may store instructions that, when executed by the processor, cause the processor to perform processing. The processing may include receiving a command configured to be executed by an external user device. The external user device and the user device may be members of a network of trust. The processing may include detecting, by the wireless transceiver, a plurality of member devices of the network of trust in communication range of the device. The processing may include sending, by the wireless transceiver, the command to each of the plurality of member devices.

15 Claims, 12 Drawing Sheets

(56) References Cited

U.S. PATENT DOCUMENTS

| | | | |
|---|---|---|---|
| 8,812,013 B2* | 8/2014 | Agarwal | H04W 64/00 |
| | | | 455/457 |
| 9,159,063 B1* | 10/2015 | McDonald | G06Q 20/382 |
| 9,485,673 B2* | 11/2016 | Turunen | H04W 4/38 |
| 9,820,134 B2 | 11/2017 | Fransen et al. | |
| 9,990,621 B1 | 6/2018 | Ng et al. | |
| 10,015,720 B2* | 7/2018 | Perdomo | H04L 5/0007 |
| 10,049,349 B1* | 8/2018 | Grassadonia | G06Q 20/40 |
| 10,127,532 B1 | 11/2018 | Grassadonia | |
| 10,185,595 B1 | 1/2019 | Ramatchandirane et al. | |
| 10,270,770 B1 | 4/2019 | Irwan et al. | |
| 10,453,061 B2* | 10/2019 | Koeppel | G06Q 20/3226 |
| 10,588,175 B1 | 3/2020 | Koeppel et al. | |
| 10,614,445 B1 | 4/2020 | Dorsey et al. | |
| 10,887,107 B1 | 1/2021 | Chan | |
| 11,127,006 B2* | 9/2021 | Koeppel | H04W 12/06 |
| 11,494,757 B2* | 11/2022 | Koeppel | G06Q 20/02 |
| 2007/0223398 A1 | 9/2007 | Luo et al. | |
| 2007/0255653 A1 | 11/2007 | Tumminaro et al. | |
| 2008/0046758 A1 | 2/2008 | Cha et al. | |
| 2009/0031006 A1* | 1/2009 | Johnson | H04M 3/42348 |
| | | | 709/218 |
| 2010/0030578 A1 | 2/2010 | Siddique et al. | |
| 2010/0043056 A1 | 2/2010 | Ganapathy | |
| 2010/0078472 A1* | 4/2010 | Lin | G06Q 20/405 |
| | | | 235/379 |
| 2011/0320291 A1 | 12/2011 | Coon | |
| 2012/0094635 A1 | 4/2012 | Ananthanarayanan et al. | |
| 2012/0314623 A1* | 12/2012 | Pesonen | H04W 40/32 |
| | | | 370/254 |
| 2013/0085831 A1 | 4/2013 | Runyan | |
| 2013/0085931 A1 | 4/2013 | Runyan | |
| 2014/0330656 A1 | 11/2014 | Zhou et al. | |
| 2014/0351118 A1 | 11/2014 | Zhao | |
| 2014/0379584 A1 | 12/2014 | Ward | |
| 2015/0100482 A1* | 4/2015 | Zamer | G06Q 50/01 |
| | | | 705/40 |
| 2015/0278506 A1 | 10/2015 | Jun et al. | |
| 2016/0088424 A1 | 3/2016 | Polo et al. | |
| 2016/0117670 A1 | 4/2016 | Davis | |
| 2016/0247156 A1 | 8/2016 | Hwang et al. | |
| 2016/0321762 A1 | 11/2016 | Schuman | |
| 2016/0337863 A1 | 11/2016 | Robinson et al. | |
| 2016/0364787 A1 | 12/2016 | Walker et al. | |
| 2017/0006453 A1 | 1/2017 | Liu et al. | |
| 2017/0105109 A1 | 4/2017 | Berenberg | |
| 2017/0126834 A1 | 5/2017 | Fransen | |
| 2017/0178122 A1 | 6/2017 | Flinter et al. | |
| 2017/0180128 A1 | 6/2017 | Lu | |
| 2017/0186003 A1 | 6/2017 | Monaghan | |
| 2017/0187831 A1 | 6/2017 | Otting et al. | |
| 2017/0236118 A1 | 8/2017 | Laracey | |
| 2017/0243204 A1* | 8/2017 | Murphy | G06Q 20/3829 |
| 2017/0337528 A1 | 11/2017 | Hall et al. | |
| 2017/0338959 A1 | 11/2017 | Hong et al. | |
| 2018/0013707 A1* | 1/2018 | Murphy | H04L 51/18 |
| 2018/0054407 A1* | 2/2018 | Cudak | H04L 51/214 |
| 2018/0183587 A1 | 6/2018 | Won et al. | |
| 2018/0276655 A1 | 9/2018 | Sawant et al. | |
| 2018/0276666 A1 | 9/2018 | Haldenby | |
| 2018/0330346 A1 | 11/2018 | Grassadonia et al. | |
| 2018/0341775 A1 | 11/2018 | Gisolfi et al. | |
| 2019/0007198 A1 | 1/2019 | Neumann et al. | |
| 2019/0034917 A1 | 1/2019 | Nolan et al. | |
| 2019/0036906 A1* | 1/2019 | Biyani | H04L 63/20 |
| 2019/0044703 A1 | 2/2019 | Smith | |
| 2019/0075102 A1 | 3/2019 | Kim et al. | |
| 2019/0180266 A1 | 6/2019 | Sidhu et al. | |
| 2019/0228631 A1* | 7/2019 | Stinson | G08B 21/02 |
| 2019/0251526 A1 | 8/2019 | Jackson | |
| 2019/0296969 A1* | 9/2019 | Zimny | H04W 12/03 |
| 2020/0169874 A1* | 5/2020 | Wagner | H04W 12/08 |
| 2021/0112068 A1 | 4/2021 | Harris et al. | |
| 2021/0152365 A1 | 5/2021 | Nossier et al. | |

OTHER PUBLICATIONS

Ron White, How Computers Work, Oct. 15, 2015, 03 Que Publishing, 7th Ed, p. 4, (Year: 2003).

Anonymous, Multi-point near field communication payments by mobile device https://ip.com/IPCOM/000225396 Publication Date: Feb. 13, 2013 (Year: 2013).

Hortelano D, Olivares T, Ruiz MC, Garrido-Hidalgo C, Lopez V. From Sensor Networks to Internet of Things. Bluetooth Low Energy, a Standard for This Evolution. Sensors (Basel). Feb. 14, 2017;17(2):372. doi: 10.3390/s17020372. PMID: 28216560; PMCID: PMC5336115. (Year: 2017).

Bluetooth Mesh Model 1.0, Legacy Specification adopted on Jul. 13, 2017, retrieved from https://www.bluetooth.com/specifications/specs/mesh-model-1-0/ (Year: 2017).

Bluetooth LE: mesh, retrieved from https://web.archive.org/web/20170901202951/https://www.bluetooth.com/what-is-bluetooth-technology/how-it-works/le-mesh on Sep. 1, 2017 (Year: 2017).

Techcrunch.com Square Cash for iOS Now Lets You Send Money To Nearby Friends Via Bluetooth, Published Oct. 7, 2014, retrieved Oct. 7, 2021 from https://techcrunch.com/2014/10/07/square-cash-for-ios-now-lets-you-send-money-to-nearby-friends-via-bluetooth/ (Year: 2017).

Bluetooth LE: Broadcast., retrieved from https://www.bluetooth.com/what-is-bluetooth-technology/how-it-works/le-broadcast on Dec. 2, 2017 (Year: 2017).

Lin YW, Lin CY, An Interactive Real-Time Locating System Based on Bluetooth Low-Energy Beacon Network Sensors (Basel). May 21, 2018;18(5):1637. doi: 10.3390/s18051637. PMID: 29883386; PMCID: PMC5981856 (Year: 2017).

Yohan et al, "An Indoor Positioning-Based Mobile Payment System Using Bluetooth Low Energy Technology", Sensors, vol. 18, No. 974, 26 pages, Mar. 25, 2018.

Mandel et al, "An Architecture Design for Wireless Authentication Security in Bluetooth Network", International Journal of Security and its Applications, vol. 8, No. 3, pp. 1-8, (2014).

Anonymous, "Software Application for bill splitting", https://ip.com/IPCOM/000251942, 2017, IP.com (Year: 2017).

\* cited by examiner

REMOTE COMMANDS USING NETWORK OF TRUST

PRIORITY

This application is a continuation of U.S. patent application Ser. No. 16/169,768, filed Oct. 24, 2018, the entirety of which is referenced herewith.

BACKGROUND

Various electronic devices are configured to perform financial transactions such as exchanging value in an account (e.g., monetary value in a debit or credit account) for goods and/or services. Ensuring that these transactions are legitimate (e.g., are actually being conducted between the purported parties) and/or ensuring that the transactions are being performed according to the user's preferences are matters of great concern. For example, a user of an electronic device may have an account with a bank or other financial institution. To request a transaction, the electronic device generate a transaction request and send the request to a server operated by the financial institution. The server may analyze the request and determine how likely it is to be legitimate. In another example, users may select payment methods from among a plurality available and/or may coordinate with other payers to pay for goods or services. In the example of bill splitting among multiple payment methods and/or parties, each party may have to initiate their own transactions separately, making sure they have coordinated correctly to pay the bill.

SUMMARY OF THE DISCLOSURE

In some embodiments, a device configured to perform shared secure transactions may include a processor. The device may include a wireless transceiver in communication with the processor. The device may include a non-transitory memory storing instructions that, when executed by the processor, cause the processor to perform processing. The processing may include sending, by the wireless transceiver, a request to share a transaction to at least one external user device in communication range of the device. The processing may include receiving, at the wireless transceiver, at least one sharing confirmation from the at least one external user device. The at least one sharing confirmation may indicate at least one portion of a total value of the transaction to be paid by at least one account associated with the at least one external user device. The processing may include generating a transaction request. The transaction request may include data describing the transaction and a transaction portion to be paid by an account associated with the device. The transaction portion may be the total value minus the at least one portion from the at least one external user device. The processing may include sending the transaction request to a transaction service for fulfillment.

In some embodiments, the processing may include sending a request for preauthorization of the account associated with the device to the transaction service.

In some embodiments, the processing may include detecting, using the wireless transceiver, the at least one external user device in communication range of the device. The processing may include establishing trust between the device and the at least one external user device. In some embodiments, establishing trust may include sending, by the wireless transceiver, a challenge to the at least one external user device in response to the detecting. Establishing trust may include receiving, by the wireless transceiver, at least one external user device identifier from the at least one external device in response to the challenge. In some embodiments, the transaction request may include a cryptogram containing the data describing the transaction and the at least one external user device identifier.

In some embodiments, the at least one sharing confirmation may include an indication of at least one user account into which at least one external user is logged in on the at least one external user device.

In some embodiments, the at least one sharing confirmation may include a plurality of sharing confirmations received from a plurality of external user devices. Each of the plurality of sharing confirmations may include a separate portion of the total value of the transaction to be paid by the respective external user device.

In some embodiments, the device may include a user interface. The processing may include receiving, by the user interface, the transaction portion.

In some embodiments, the device may include a user interface. The processing may include receiving, by the user interface, a selection of the at least one external user device to which the request is sent from among a plurality of external user devices in communication range of the device.

In some embodiments, a device configured to perform shared secure transactions may include a processor. The device may include a wireless transceiver in communication with the processor. The device may include a non-transitory memory storing instructions that, when executed by the processor, cause the processor to perform processing. The processing may include receiving, at the wireless transceiver, a request to share a transaction from an external user device in communication range of the device. The processing may include generating a sharing confirmation indicating a portion of a total value of the transaction to be paid by an account associated with the device. The processing may include sending, by the wireless transceiver, the sharing confirmation to the external user device. The processing may include generating a transaction request. The transaction request may include data describing the transaction and the portion of the total value. The processing may include sending the transaction request to a transaction service for fulfillment.

In some embodiments, the device may include a user interface. The processing may include receiving, by the user interface, approval of the sharing confirmation.

In some embodiments, the device may include a user interface. The processing may include receiving, by the user interface, the portion of the total value.

In some embodiments, the processing may include detecting, using the wireless transceiver, the external user device in communication range of the device. The processing may include establishing trust between the device and the external user device. In some embodiments, establishing trust may include receiving, by the wireless transceiver, a challenge from the external user device, generating a message comprising a device identifier for the device, and sending, by the wireless transceiver, the message to the external user device in response to the challenge.

In some embodiments, the sharing confirmation may include an indication of a user account into which user is logged in on the device.

In some embodiments, a system configured to process shared secure transactions may include a processor. The system may include a transceiver in communication with the processor. The system may include a non-transitory memory storing instructions that, when executed by the processor, cause the processor to perform processing. The processing may include receiving, by the transceiver, a transaction request from a user device. The transaction request may include data describing the transaction and a transaction portion to be paid by an account associated with the user device. The transaction portion may be a total value of the transaction minus at least one portion from at least one external user device. The processing may include receiving, by the transceiver, at least one additional transaction request from the at least one external user device. The at least one additional transaction request may include data describing the transaction, the at least one portion, and at least one additional account associated with the at least one external user device from which the at least one portion is to be paid. The processing may include associating the transaction request and the at least one additional transaction request with a single transaction. The processing may include processing the single transaction according to the transaction request and the at least one additional transaction request.

In some embodiments, the processing may include receiving, by the transceiver, a request for preauthorization of the account associated with the device. The processing may include processing the request for preauthorization.

In some embodiments, processing the single transaction may include sending at least a portion of the data describing the transaction to a backend system configured to debit the account.

In some embodiments, processing the single transaction may include processing a plurality of separate transactions for the account and the at least one additional account. In some embodiments, processing the plurality of separate transactions may include sending at least a portion of the data describing the transaction to at least one backend system configured to debit the account and the at least one additional account.

In some embodiments, a user device may include a processor. The device may include a wireless transceiver in communication with the processor. The device may include a non-transitory memory storing instructions that, when executed by the processor, cause the processor to perform processing. The processing may include receiving a command configured to be executed by an external user device. The external user device and the user device may be members of a network of trust. The processing may include detecting, by the wireless transceiver, a plurality of member devices of the network of trust in communication range of the device. The processing may include sending, by the wireless transceiver, the command to each of the plurality of member devices.

In some embodiments, the processing may include determining at least one of the members of the network of trust. In some embodiments, the determining may include detecting, by the wireless transceiver, at least one external device. The determining may include sending, by the wireless transceiver, a challenge to the at least one external device in response to the detecting. The determining may include receiving, by the wireless transceiver, the at least one external device identifier in response to the challenge. In some embodiments, the determining may include receiving information identifying at least a portion the members of the network of trust from a data source.

In some embodiments, receiving the command may include receiving the command from a server.

In some embodiments, receiving the command may include receiving, by the wireless transceiver, the command in a broadcast message sent by at least one of the members of the network of trust.

In some embodiments, the processing may include receiving, by the wireless transceiver, a challenge from the at least one external device. The processing may include generating a message comprising a device identifier for the device. The processing may include sending, by the wireless transceiver, the message to the at least one external device in response to the challenge.

In some embodiments, the command may include instructions to disable at least one function of the external user device.

In some embodiments, a user device may include a processor. The device may include a wireless transceiver in communication with the processor. The device may include a non-transitory memory storing instructions that, when executed by the processor, cause the processor to perform processing. The processing may include receiving, by the wireless transceiver, a command in a broadcast message sent by at least one member of a network of trust of which the user device is also a member. The processing may include executing the command.

In some embodiments, the processing may include determining at least one of the members of the network of trust. In some embodiments, the determining may include detecting, by the wireless transceiver, at least one external device. The determining may include sending, by the wireless transceiver, a challenge to the at least one external device in response to the detecting. The determining may include receiving, by the wireless transceiver, the at least one external device identifier in response to the challenge. In some embodiments, the determining may include receiving information identifying at least a portion the members of the network of trust from a data source.

In some embodiments, the processing may include receiving, by the wireless transceiver, a challenge from at least one external device. The processing may include generating a message comprising a device identifier for the device. The processing may include sending, by the wireless transceiver, the message to the at least one external device in response to the challenge.

In some embodiments, executing the command may include disabling at least one function of the user device.

In some embodiments, a non-transitory computer readable medium may be configured to store instructions that, when executed by at least one processor, cause the at least one processor to perform processing. The processing may include receiving a command configured to be executed by an external user device belonging to a network of trust. The processing may include detecting a plurality of member devices of the network of trust in communication range of the device. The processing may include sending, by the wireless transceiver, the command to each of the plurality of member devices.

In some embodiments, the processing may include receiving the command in a broadcast message sent by at least one member of the network of trust and executing the command. In some embodiments, executing the command may include disabling at least one function of the user device.

In some embodiments, the processing may include determining at least one of the members of the network of trust. In some embodiments, the determining may include detecting at least one external device, sending a challenge to the at least one external device in response to the detecting, and receiving the at least one external device identifier in response to the challenge. In some embodiments, the determining may include receiving information identifying at least a portion the members of the network of trust from a data source.

In some embodiments, a device configured to function within a network of trust may include a processor. The device may include a wireless transceiver in communication with the processor. The device may include a non-transitory memory storing instructions that, when executed by the processor, cause the processor to perform processing. The processing may include detecting, using the wireless transceiver, at least one external device in communication range of the device. The processing may include receiving, by the wireless transceiver, at least one external device identifier from the at least one external device. The processing may include verifying the at least one external device identifier. The verifying may include locating the at least one device identifier in a blockchain record of a transaction involving the at least one external device. The processing may include performing at least one transaction requiring the verified at least one external device identifier.

In some embodiments, the processing may include sending, by the wireless transceiver, a challenge to the at least one external device in response to the detecting. In some embodiments, the at least one external device identifier may be received in response to the challenge.

In some embodiments, performing the at least one transaction may include generating and sending a transaction request comprising data describing a transaction to be processed, a device identifier describing a requesting device, and the verified at least one external device identifier.

In some embodiments, performing the at least one transaction may include sending, by the wireless transceiver, a request to share a transaction to the at least one external device. Performing the at least one transaction may include receiving, at the wireless transceiver, at least one sharing confirmation from the at least one external device. The at least one sharing confirmation may indicate at least one portion of a total value of the transaction to be paid by at least one account associated with the at least one external device. Performing the at least one transaction may include generating a transaction request. The transaction request may include data describing the transaction, a transaction portion to be paid by an account associated with the device, and the verified at least one external device identifier. The transaction portion may be the total value minus the at least one portion from the at least one external device. Performing the at least one transaction may include sending the transaction request to a transaction service for fulfillment.

In some embodiments, performing the at least one transaction may include sending a command configured to be executed by an external device belonging to the network of trust to the at least one external device.

In some embodiments, performing the at least one transaction may include receiving a command in a broadcast message sent by the at least one external device and executing the command.

In some embodiments, a device configured to function within a network of trust may include a processor. The device may include a wireless transceiver in communication with the processor. The device may include a non-transitory memory storing instructions that, when executed by the processor, cause the processor to perform processing. The processing may include recording a transaction in a blockchain record including a device identifier. The processing may include detecting, using the wireless transceiver, at least one external device in communication range of the device. The processing may include receiving, by the wireless transceiver, a challenge from an external device. The processing may include sending, by the wireless transceiver, a response to the challenge to the external device. The response may include the device identifier. The processing may include performing at least one transaction also involving the external device.

In some embodiments, the processing may include generating the device identifier. In some embodiments, the generating may include creating a unique hash value associated with the recorded transaction.

In some embodiments, performing the at least one transaction may include generating and sending a transaction request comprising data describing a transaction to be processed, a device identifier describing a requesting device, and the verified at least one external device identifier.

In some embodiments, performing the at least one transaction may include sending, by the wireless transceiver, a request to share a transaction to the at least one external user device. Performing the at least one transaction may include receiving, at the wireless transceiver, at least one sharing confirmation from the at least one external device. The at least one sharing confirmation may indicate at least one portion of a total value of the transaction to be paid by at least one account associated with the at least one external device. Performing the at least one transaction may include generating a transaction request. The transaction request may include data describing the transaction, a transaction portion to be paid by an account associated with the device, and the verified at least one external device identifier, the transaction portion being the total value minus the at least one portion from the at least one external device. Performing the at least one transaction may include sending the transaction request to a transaction service for fulfillment.

In some embodiments, performing the at least one transaction may include sending a command configured to be executed by an external device belonging to the network of trust to the at least one external device.

In some embodiments, performing the at least one transaction may include receiving a command in a broadcast message sent by the at least one external device and executing the command.

In some embodiments, a non-transitory computer readable medium may be configured to store instructions that, when executed by at least one processor, cause the at least one processor to perform processing. The processing may include detecting at least one external device in communication range of the device. The processing may include receiving at least one external device identifier from the at least one external device. The processing may include verifying the at least one external device identifier. The verifying may include locating the at least one device identifier in a blockchain record of a transaction involving the at least one external device. The processing may include performing at least one transaction requiring the verified at least one external device identifier.

In some embodiments, the processing may include sending a challenge to the at least one external device in response to the detecting. In some embodiments, the at least one external device identifier may be received in response to the challenge.

In some embodiments, the processing may include recording a transaction in a blockchain record including a device identifier, receiving a challenge from the at least one external device, sending a response to the challenge to the at least one external device, the response including the device identifier, and performing at least one transaction also involving the at least one external device. In some embodiments, the processing may include generating the device identifier. In some embodiments, the generating may include creating a unique hash value associated with the recorded transaction.

DETAILED DESCRIPTION OF SEVERAL EMBODIMENTS

Figure 1A:
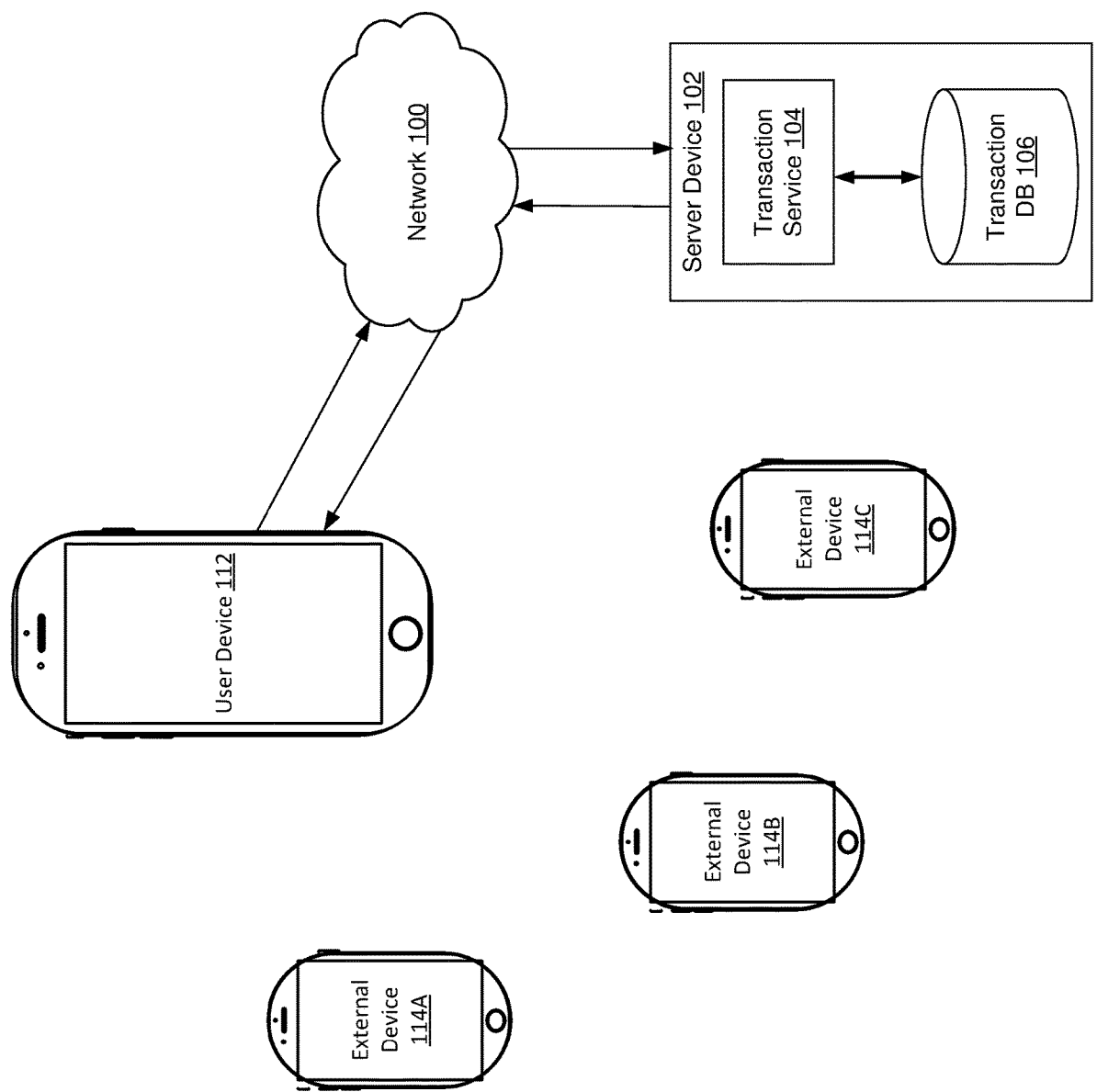
FIGS. 1A-1D show a network of trust according to an embodiment of the present disclosure.
Figure 1B:
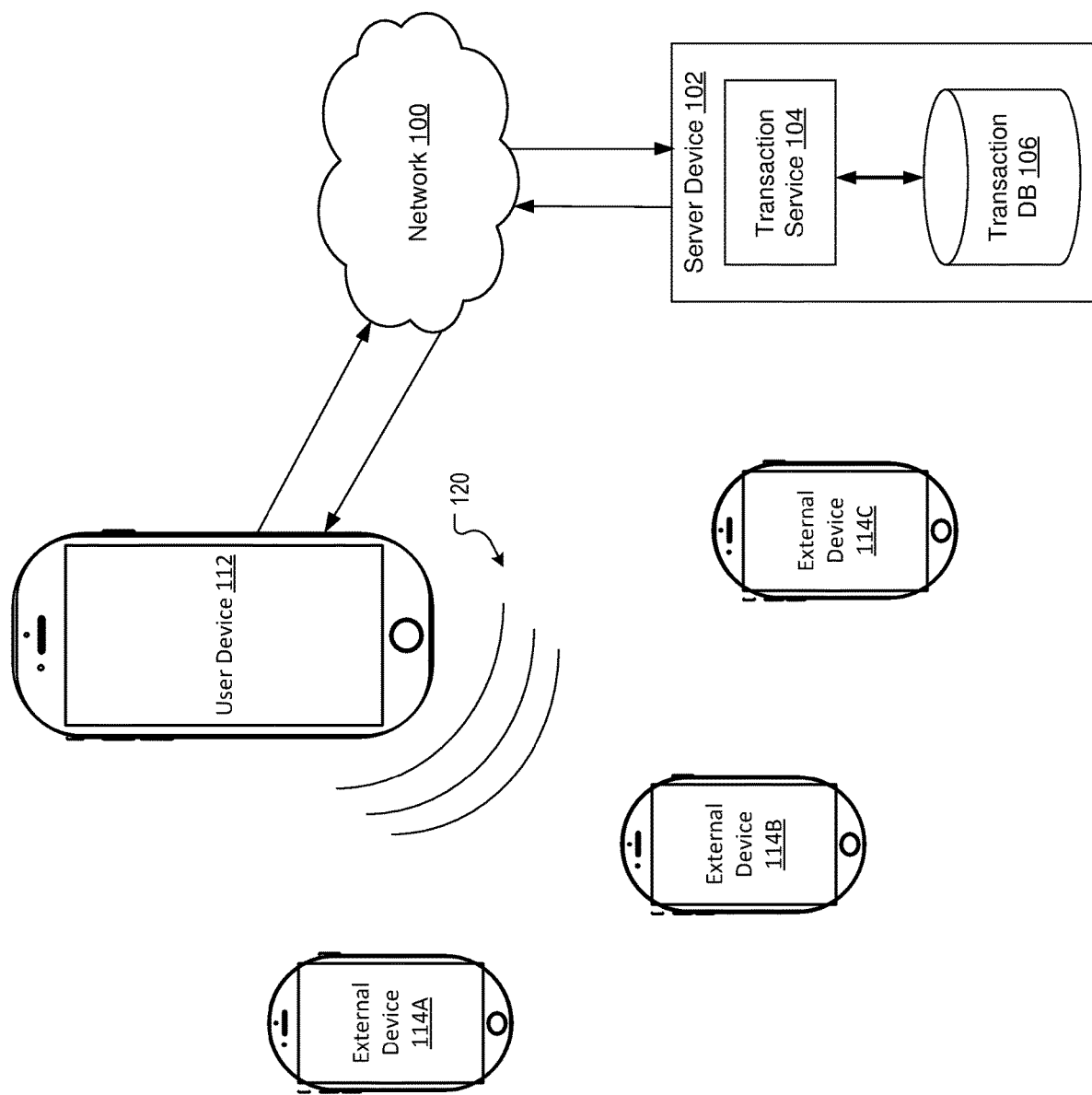
Figure 1C:
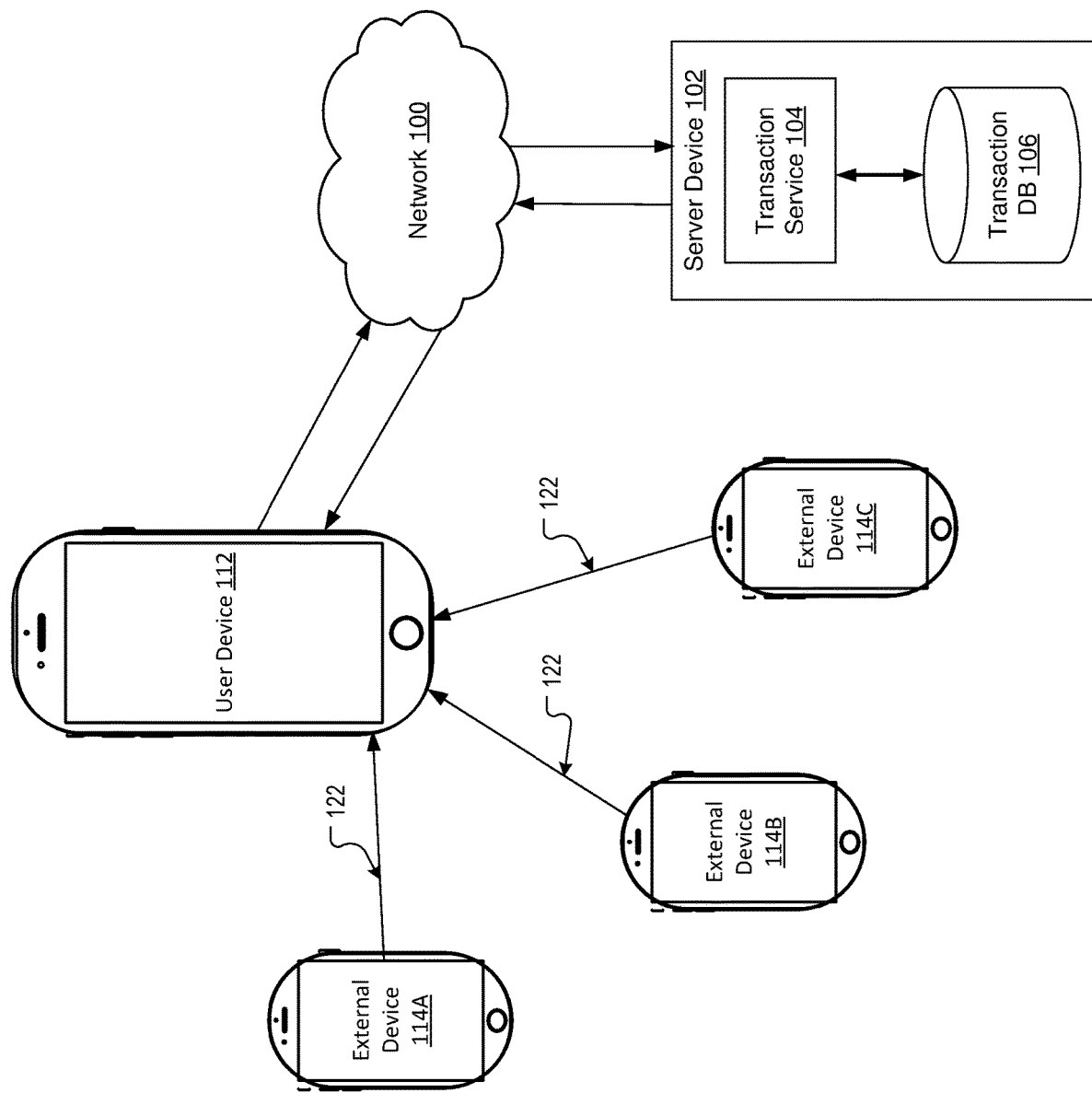

Systems and methods described herein may perform a variety of tasks through the use of a network of trust. For example, a user device may communicate with nearby devices using one or more wireless communication technologies. The user device and the nearby devices may exchange data about themselves and use this data to form a network of trust, wherein some devices may become known to one another and/or may be recognized frequently by one another in certain situations. In some embodiments, the devices may verify other devices using records stored in a blockchain. Devices within the network of trust may perform tasks through the network of trust. For example, a user device may coordinate with other devices to split a bill or other transaction. User devices may broadcast and/or receive commands intended for a specific device member of the network of trust and, when the specific device receives the command, it may execute the command. In some embodiments, devices may leverage the network of trust to enhance security of financial transactions by generating data that may be added to a transaction request to provide evidence of the request's validity (e.g., in conjunction with blockchain verification), as described in U.S. patent application Ser. No. 15/909,091, filed Mar. 1, 2018, the entirety of which is incorporated by reference herein.

The systems and methods described herein may provide several technological advantages. For example, user devices may be able to coordinate on payment splitting, wherein a group of users wishing to split a bill (e.g., at a restaurant) may generate separate, but linked, transactions with their respective devices. This may enable the automatic, seamless creation of new transaction types for processing by automated backend systems. In another example, user devices may be able to form mesh networks that may allow the user devices to exchange commands. This may allow the devices to locate a particular device (e.g., a stolen or otherwise lost device) and, through the mesh network without specific knowledge of a destination, propagate a command to the particular device (e.g., a kill or disable command) which may be executed by the particular device. In another example, by gathering data about what devices are nearby, a transacting user device can add an indicator of the user's authentic identity to a transaction request (e.g., in addition to other indicators) based on consistency of devices appearing near the transacting user device and being verified by the transacting user device. This may provide an automatic indicator of trust based on networking capabilities uniquely and seamlessly provided by devices in proximity to one another.

FIGS. 1A-1D show a network of trust according to an embodiment of the present disclosure. The network of trust may exist in the context of user device 112 performing or attempting to perform a transaction (e.g., purchasing something from a vendor in exchange for funds). User device 112 may be a smartphone, tablet, computer, or other device configured to request transactions. User device 112 may send transaction data to server device 102 by network 100 (e.g., the Internet or another public and/or private network). Server device 102 may be a server configured to debit, credit, and/or transfer money to and/or from an account of a user of user device 112. For example, server device 102 may be associated with a user's checking account or credit card account (for the purposes of providing an example, assume server device 102 is associated with a credit card account). Server device 102 may include transaction service 104, which may be configured to process transactions, and transaction database 106, which may be configured to store transaction and/or account data. Server device 102 is depicted as a single server including a single transaction service 104 and transaction database 106 for ease of illustration, but those of ordinary skill in the art will appreciate that server device 102 may be embodied in different forms for different implementations. For example, server device 102 may include a plurality of servers. In some embodiments, server device 102 may include transaction processing network servers (e.g. credit card processing servers), and payment transaction data may flow through transaction processing network servers before reaching transaction service 104.

User device 112 may send transaction data to server device 102, and server device 102 may use the transaction data to process the transaction and/or to decide whether to process the transaction. The transaction data may include data describing the transaction. For example, the transaction data may indicate the parties to the transaction and an amount (e.g., in currency) to be paid from the credit account of the payor (e.g., the owner of user device 112) to an account of the payee.

In some embodiments, user device 112 may include data with the transaction data identifying other devices in proximity with user device 112. For example, user device 112 may include data identifying one or more external devices 114 with the transaction data. For example, the data identifying the other devices may be used by server device 102 to evaluate the trustworthiness of the requested transaction, to verify a device's identity through a check of a blockchain transaction record, to process a split transaction involving multiple paying devices, and/or for other purposes.

User device 112 and external devices 114 may establish a network of trust through communication. For example, user device 112 may broadcast a challenge 120 using one or more wireless communication technologies (e.g., Bluetooth, WiFi, etc.). In some embodiments, challenge 120 may include a request to respond with information identifying the receiving external device 114. In some embodiments, challenge 120 may include a processing request whose result is to be returned by external device 114 (e.g., token processing as described herein). Challenge 120 may have a limited range. External devices 114 that are within challenge range of user device 112 may receive challenge 120.

An external device 114 that receives challenge 120 may send a response 122 back to user device 112. For example, external device 114 may send response 122 using the same one or more wireless communication technologies (e.g., Bluetooth, WiFi, etc.) by which challenge 120 was received. Response 122 may include information identifying external device 114, such as a unique device identifier. In some embodiments, only external devices 114 that are also registered with server device 102 (e.g., because they belong to account holders) may send responses 122. In some embodiments, device identifiers associated with account holders may be considered "trusted devices," the presence of which may suggest legitimacy.

In some embodiments, user device 112 and external devices 114 may operate as a mesh network. Thus, external devices 114 that are not in range of user device 112 when user device 112 broadcasts challenge 120 may share information about themselves (e.g., response 122) even if they are out of range. For example, assume each external device 114 has a range of 10 meters (this is used for example only, as other ranges may be possible. User device 112 may communicate with external device 114A. External device 114A may additionally reach out to external device 114B with a challenge and provide a verification response from external device 114B along with external device 114A's own response to user device 112.

As a feature of the mesh network, user device 112 and external devices 114 may be able to broadcast commands intended for a specific device throughout the mesh network. For example, user device 112 and/or some of the external devices 114 may receive a command from server device 102 or from another device 112/114 in the mesh network. The command may be intended for a specific device 112/114. As devices 112/114 move through the environment and come within communication range of one another, they may broadcast the command, and devices 112/114 receiving the command may themselves broadcast the command to other devices 112/114. This may continue until the intended device (e.g., one of the external devices 114) receives the command and executes the command.

User device 112 may include any device identifiers received from external devices 114 with the transaction request sent to server device 102. Transaction service 104 may examine the device identifiers to determine whether they are valid and/or recognized. For example, a device identifier for an external device 114 may be valid when it is a real identifier (as opposed to a spoofed identifier generated by hacking a device, for example) and/or when it is registered with server device 102 and stored in transaction database 106. A device identifier for an external device 114 may be recognized when it has been included in previous transaction requests from user device 112, for example. The presence of valid and recognized device identifiers may indicate that the requested transaction is likely to be legitimate, so transaction service 104 may lower or maintain a threat score for the transaction in this case. However, if one or more device identifiers is invalid or unrecognized, transaction service 104 may raise the threat score for the transaction. In some embodiments, transactions reaching a predetermined threat score threshold may be flagged for follow-up investigation and/or may be declined.

Figure 1D:
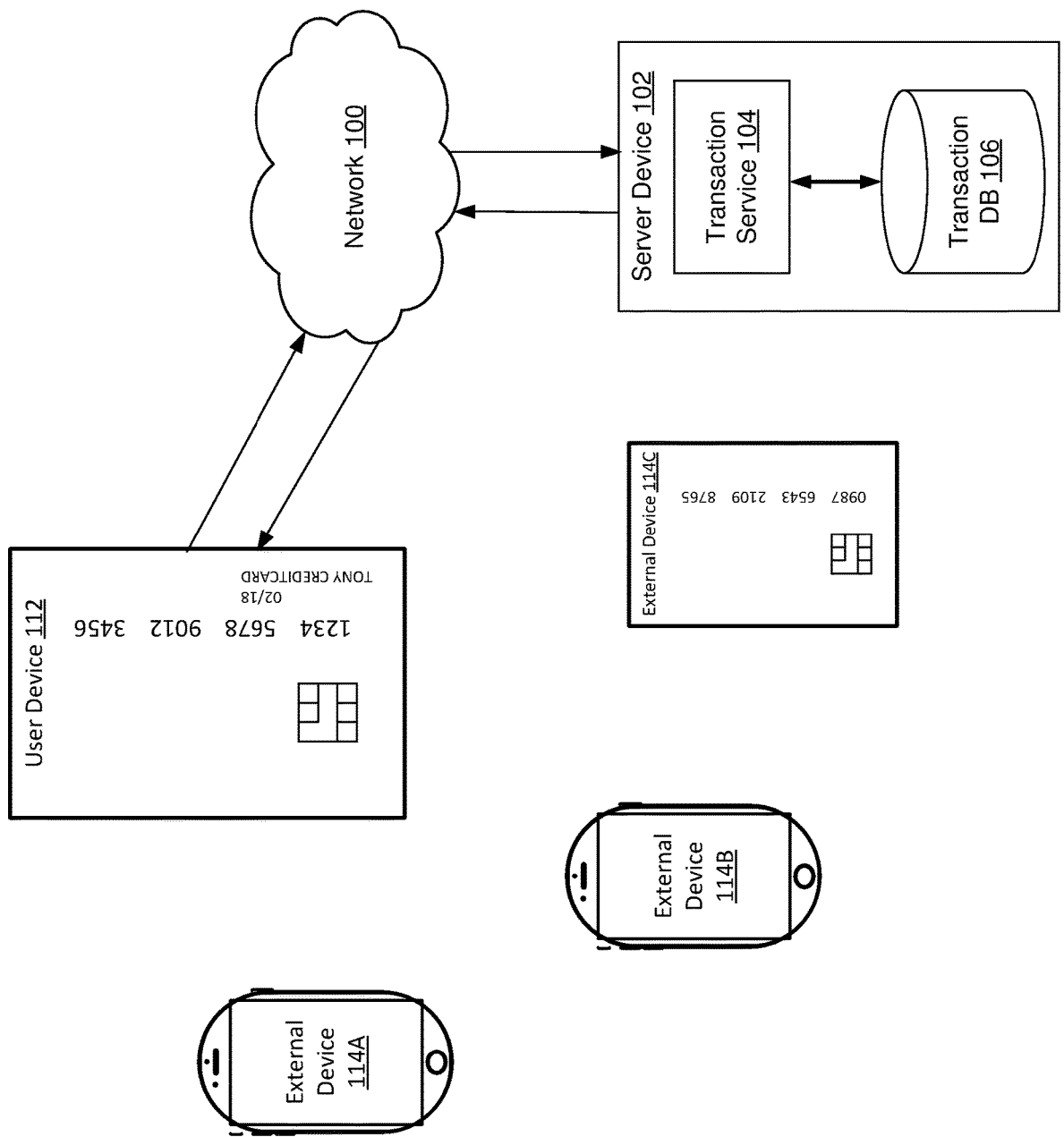

As shown in FIG. 1D, user devices 112 and/or external devices 114 need not necessarily be typical computing devices such as smartphones, tablets, personal computers, smart watches, fitness trackers, etc. In some embodiments, user device 112 and/or external devices 114 (e.g., external device 114C) may be credit or debit cards with data processing systems and functionality. For example, a credit or debit card may include one or more processors, power sources (e.g., rechargeable batteries), and/or communication systems (e.g., Bluetooth transceivers). Such credit or debit cards may be configured to perform the actions of user devices 112 and/or external devices 114 described herein. In some embodiments, such credit or debit cards may be configured to wake up certain components (e.g., processor, communication system, etc.) only during the transaction processing to conserve battery power.

Figure 2:
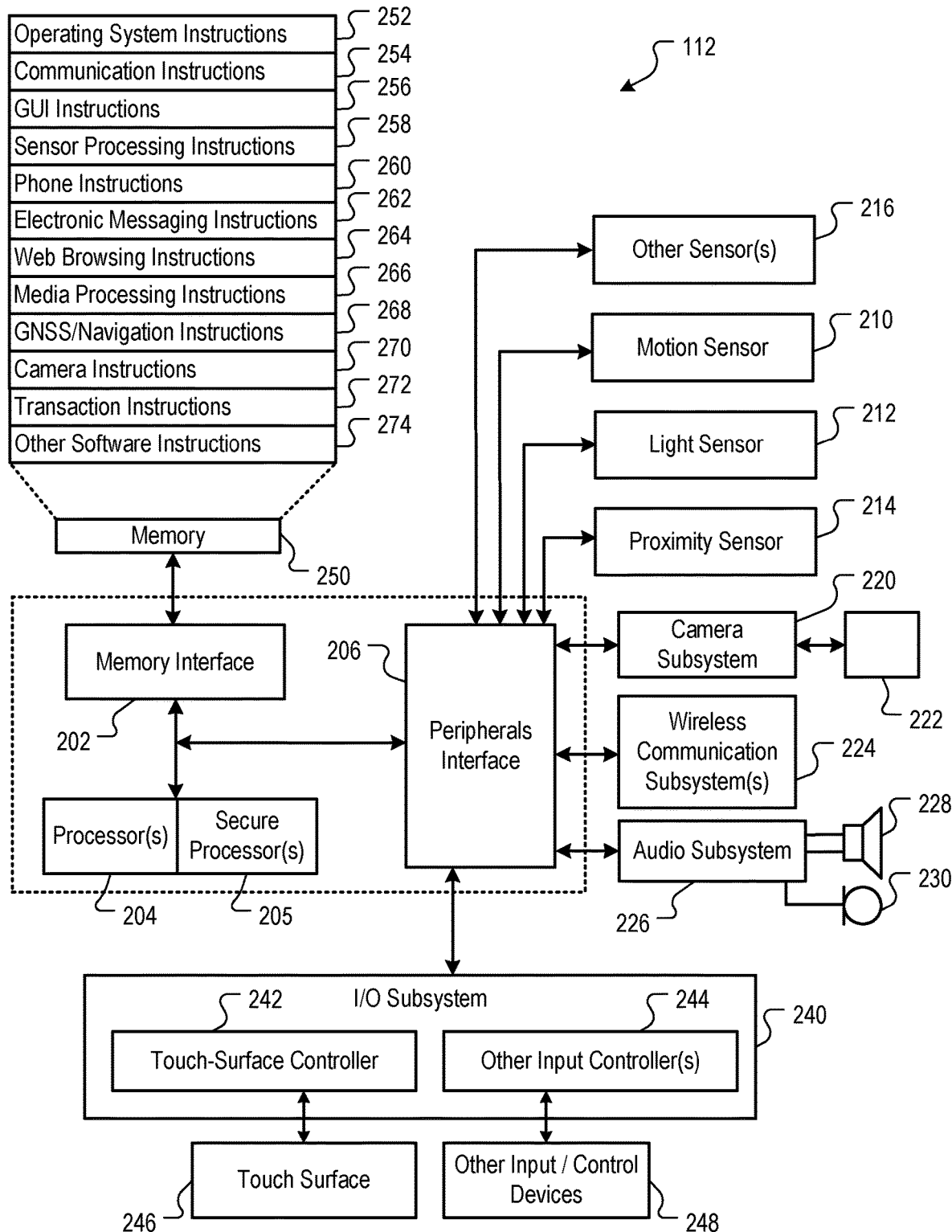
FIG. 2 shows a user device according to an embodiment of the present disclosure.

FIG. 2 shows a block diagram of an example computing device, for example a computing device configured to function as user device 112 and/or external device 114. For example, user device 112 may interact with external device 114 and/or server device 102 to gather data about local devices and include the data in transaction requests as described herein. The device illustrated in FIG. 2 is a user device (e.g., user device 112), but it will be understood that other devices such as external device 114 may be configured similarly. The user device 112 may include a memory interface 202, one or more data processors, image processors, central processing units 204, and/or secure processing units 205, and a peripherals interface 206. The memory interface 202, the one or more processors 204 and/or secure processors 205, and/or the peripherals interface 206 may be separate components or may be integrated in one or more integrated circuits. The various components in the user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store transaction instructions 272 to facilitate other processes and functions, such as determining the presence of external devices 114, forming transaction requests, and/or communicating with server device 102 to process the transaction requests as described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

In some embodiments, processor 204 may perform processing including executing instructions stored in memory 250, and secure processor 205 may perform some processing in a secure environment that may be inaccessible to other components of user device 112. For example, secure processor 205 may include cryptographic algorithms on board, hardware encryption, and physical tamper proofing. Secure processor 205 may be manufactured in secure facilities. Secure processor 205 may encrypt data/challenges from external devices. Secure processor 205 may encrypt entire data packages that may be sent from user device 112 to the network. Secure processor 205 may separate a valid user/external device from a spoofed one, since a hacked or spoofed device may not have the private keys necessary to encrypt/decrypt, hash, or digitally sign data, as described herein.

Figure 3:
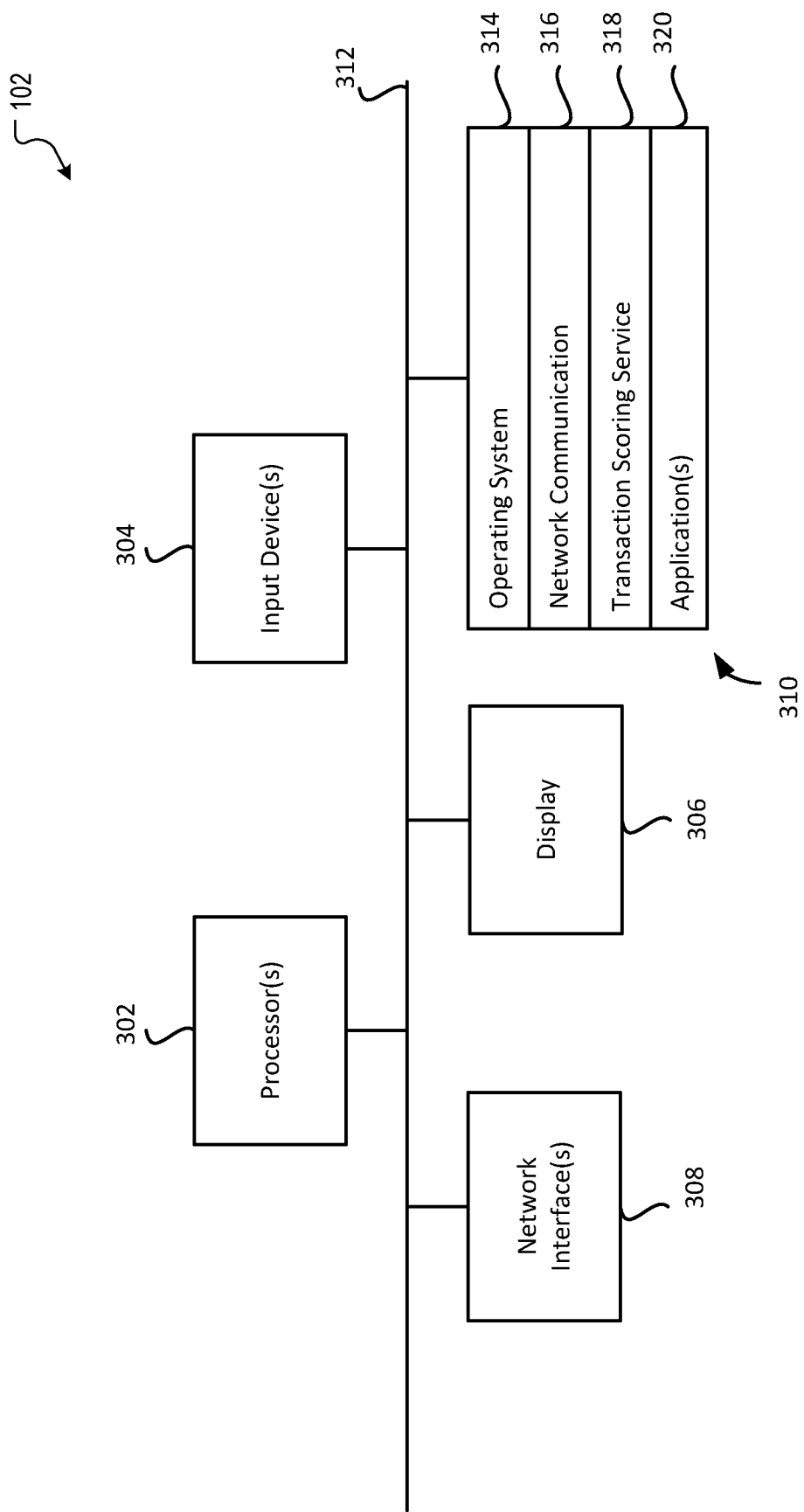
FIG. 3 shows a server device according to an embodiment of the present disclosure.

FIG. 3 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Transaction processing service instructions 318 can include instructions that evaluate transaction requests as described herein. For example, transaction processing service instructions 318 may evaluate and/or process transaction requests as described herein.

Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
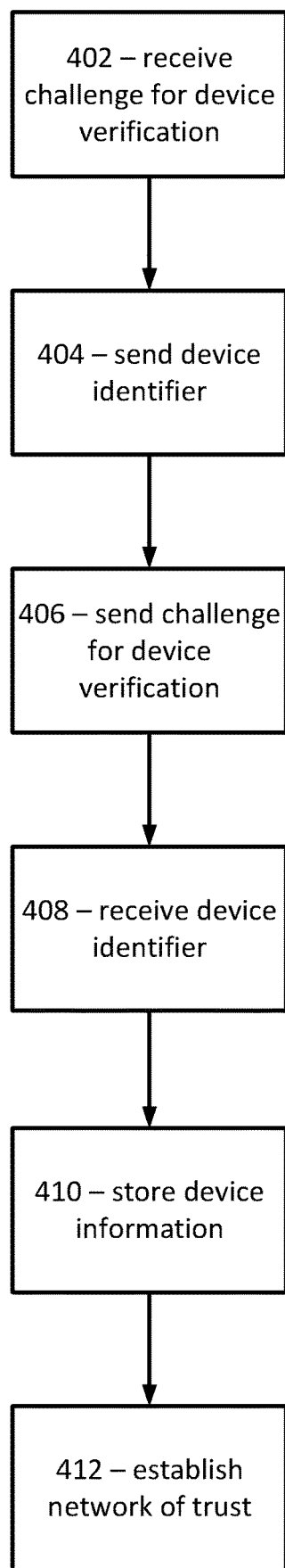
FIG. 4 shows a network of trust establishment process according to an embodiment of the present disclosure.

FIG. 4 shows a network of trust establishment process 400 according to an embodiment of the present disclosure. One or more of user device 112 and/or external device(s) may perform network of trust establishment process 400 when in communication range with one another. In the example of FIG. 4, user device 112 may perform process 400 for purposes of illustration. In some embodiments, network of trust establishment process 400 may be performed as a precursor to performing other network of trust based actions such as process 500, 600, or 700, which are described in detail below.

At 402, user device 112 may receive a challenge 120 from an external device 114. For example, an external device 114 may broadcast challenge 120, and any external devices 114 and/or user device 112 that are within challenge range of the broadcasting external device 114 may receive challenge 120. In some embodiments, only devices 112/114 that are also registered with server device 102 (e.g., because they belong to account holders) may continue processing according to network of trust establishment process 400 after receiving challenge 120. For example, registered devices 112/114 may have one or more applications installed thereon (e.g., banking app or account app including transaction instructions 272) that may facilitate processing related to process 400 and/or the other processes described below (e.g., process 500, 600, 700, 800, or 900).

Challenge 120 may be sent in a variety of scenarios. For example, devices 112/114 may send challenge 120 in response to a user attempting a transaction, periodically, or when user devices 112/114 enter a particular location or move to a new location. Accordingly, devices 112/114 may be configured to regularly monitor its surroundings to detect other devices 112/114 that may be nearby.

At 404, user device 112 may generate and send a response 122 to challenge 120. For example, user device 112 may send response 122 using the same one or more wireless communication technologies (e.g., Bluetooth, WiFi, etc.) by which challenge 120 was received. Response 122 may include information identifying user device 112, such as a unique device identifier. In some embodiments, where challenge 120 includes a processing request, user device 112 may perform the requested processing and include a result thereof (e.g., a validated token and/or a result of process 800 described below) in response 122.

At 406, user device 112 may generate and send a challenge 120 to the external device 114, for example to allow external device 114 to perform similar response generation (e.g., generating a validated token and/or a result of process 800 described below). In some embodiments, user device 112 may include the challenge 120 of 406 and the response 122 of 404 in a same transmission.

At 408, user device 112 may receive a response 122 to the challenge 120 sent at 406 from external device 114. As noted above, external device 114 may generate the response 122 in a similar manner to how user device 112 generated its own response 112 (e.g., by generating a validated token and/or a result of process 800 described below).

At 410, user device 112 may store information about external device 114 received in the response 122 of 408. While not shown in FIG. 4, it may be understood that external device 114 may have similarly saved information about user device 112 sent by user device 112 at 404. At 412, based on the stored information, user device 112 and external device 114 may be members of a network of trust. Accordingly, user device 112 and external device 114 may be configured to perform network of trust based actions such as process 500, 600, or 700, which are described in detail below.

Figure 5:
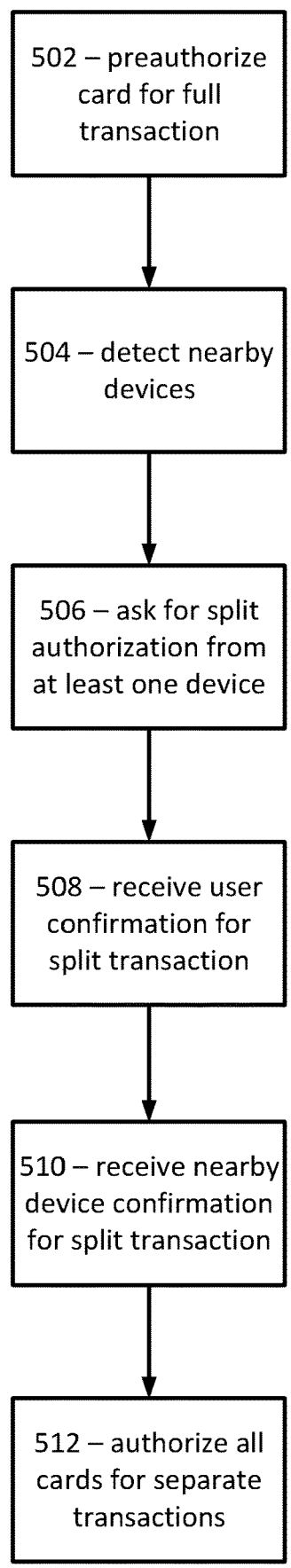
FIG. 5 shows a bill splitting initiation process according to an embodiment of the present disclosure.

FIG. 5 shows a bill splitting initiation process 500 according to an embodiment of the present disclosure. Bill splitting initiation process 500 may enable user device 112 to split the cost of what may otherwise be a single transaction with at least one other device 114 in the network of trust (e.g., established by process 400). User device 112 may perform bill splitting initiation process 500 in response to a user interacting with user device 112 to attempt a transaction (e.g., using a transaction app installed on user device 112, tapping user device 112 on a tap-to-pay kiosk, swiping or inserting user device 112 in a reader for embodiments where user device 112 is a card, etc.).

At 502, user device 112 may generate and send a transaction request, such as an authorization request to debit an account managed by server device 102. User device 112 may also include data identifying user device 112 and/or data describing the transaction (e.g., location, account information, transaction amount, good/service purchased, time/day, etc.). In some embodiments, user device 112 may encrypt the transaction request. In some embodiments, user device 112 may format the transaction request into a standard authorization format (e.g., a format specified by Apple Pay, Google Wallet, or other payment services). User device 112 may send the transaction request to server device 102. In response to receiving this request, server device 102 may preauthorize the account for the full amount of a transaction, even if the transaction is eventually to be split among multiple devices 112/114 and associated accounts.

At 504, user device 112 may detect external devices 114 that are within detection range. For example, user device 112 may broadcast a challenge 120 using one or more wireless communication technologies (e.g., Bluetooth, WiFi, etc.), as described above (for example, user device 112 may perform at least 406-410 of process 400, and as much as the entirety of process 400 in some embodiments). Accordingly, user device 112 may identify external devices 114 that may be part of the same network of trust.

At 506, user device 112 may communicate with at least one of the external devices 114 to request a split authorization of the transaction preauthorized at 502. For example, user device 112 may send information to at least one of the external devices 114 (e.g., by one or more wireless communication technologies such as Bluetooth, WiFi, etc.) describing the transaction to be split (e.g., identifying at least one of a total amount, location, good/service purchased, time/day, etc.). In some embodiments, the information may include a specific amount or percentage of the total amount requested of the at least one external device 114. In other embodiments, the information may not include a requested amount.

In some embodiments, a user of user device 112 may indicate that they wish to split the transaction cost at 508. In other embodiments, user device 112 may identify members of the network of trust and/or send the information without user prompting.

At 510, user device 112 may receive at least one response from at least one external device 114 that the information sent at 506. For example, user device 112 may receive the response using the same one or more wireless communication technologies (e.g., Bluetooth, WiFi, etc.) by the information sent at 506 was sent. In some cases, one or more responses may include information declining the request to split the transaction, which may cause process 500 to end (e.g., which may include the preauthorization at 502 becoming a full authorization). In some cases, one or more responses may include information accepting the request to split the transaction. For example, responses accepting the split may include an amount and/or percentage of the total to be paid by an account associated with the sending external device 114. Responses may also identify the sending external device 114 and/or may identify the associated account, for example.

At 512, user device 112 may generate and send a transaction request, such as an authorization request to debit an account managed by server device 102. The authorization request may be similar to the authorization request at 502, except that it may include the total transaction amount minus any amounts agreed to be paid by other devices 114 as received in responses at 510. User device 112 may also include data identifying user device 112 and/or data describing the transaction (e.g., location, account information, transaction amount (less external device 114 contributions in some embodiments), good/service purchased, time/day, etc.). The data identifying user device 112 and/or data describing the transaction may allow server device 102 to correlate the transaction request with the preauthorized request. In some embodiments, user device 112 may encrypt the transaction request. In some embodiments, user device 112 may format the transaction request into a standard authorization format (e.g., a format specified by Apple Pay, Google Wallet, or other payment services). User device 112 may send the transaction request to server device 102. In response to receiving this request, server device 102 may authorize the transaction for the reduced amount of the transaction share owed by the account associated with user device 112. As described below with respect to FIG. 6, one or more external devices 114 that responded with agreement to split the cost at 510 may perform similar processing, allowing server device 102 to authorize accounts associated therewith and thereby authorize payment for the total amount of the transaction.

Figure 6:
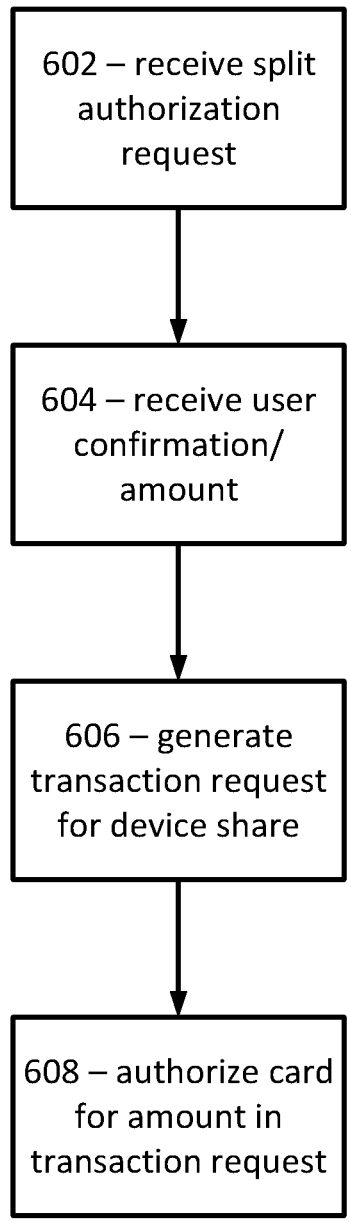
FIG. 6 shows a bill splitting response process according to an embodiment of the present disclosure.

FIG. 6 shows a bill splitting response process 600 according to an embodiment of the present disclosure. Bill splitting response process 600 may be performed by one or more external device 114 in coordination with user device 112 performing bill splitting initiation process 500.

At 602, external device 114 may receive a split authorization request from user device 112 (e.g., as sent at 506 of process 500). For example, external device 114 may receive the request from user device 112 by one or more wireless communication technologies such as Bluetooth, WiFi, etc. after trust has been established (e.g., through external device 114 performing process 400 with user device 112). The request may describe the transaction to be split (e.g., identifying at least one of a total amount, location, good/service purchased, time/day, etc.). In some embodiments, the information may include a specific amount or percentage of the total amount requested of the at least one external device 114. In other embodiments, the information may not include a requested amount.

At 604, external device 114 may receive user confirmation that the transaction may be split. For example, external device 114 may present at least a portion of the information from the request (e.g., describing at least one of user device 112 and/or a user thereof, a total amount, location, good/service purchased, time/day, etc.) through a user interface. A user of external device 114 may indicate that they wish to split the transaction cost through the user interface. In some embodiments, the user may specify an amount or percentage they wish to pay, or in other embodiments, the user may agree to an offered or predetermined amount or percentage. If the user declines to split the transaction, process 600 may end (e.g., which may include external device 114 notifying user device 112 that the request is denied). Note that in some cases, such as where multiple external devices 114 were invited to split the bill, denials from less than all external devices 114 may allow process 600 to continue for the non-denying devices (and process 500 to be fully performed, albeit with fewer total devices contributing than originally contacted).

At 606, external device 114 may a transaction request, such as an authorization request to debit an account managed by server device 102. The authorization request may include the amount agreed to be paid by an account associated with external device 114 as indicated in the response at 604. External device 114 may also include data identifying external device 114 and/or data describing the transaction (e.g., location, account information, transaction amount for external device 114, data identifying user device 112, good/service purchased, time/day, etc.). The data identifying user device 112 and/or data describing the transaction may allow server device 102 to correlate the transaction request with the preauthorized request. In some embodiments, external device 114 may encrypt the transaction request. In some embodiments, external device 114 may format the transaction request into a standard authorization format (e.g., a format specified by Apple Pay, Google Wallet, or other payment services).

At 608, external device 114 may send the authorization request generated at 606 to server device 102. In response to receiving this request, server device 102 may authorize the transaction for the amount of the transaction share owed by the account associated with external device 114. As described above with respect to FIG. 5, user device 112 and, in some cases, one or more additional external devices 114 that responded with agreement to split the cost at 510 may perform similar processing, allowing server device 102 to authorize accounts associated therewith and thereby authorize payment for the total amount of the transaction.

Figure 7:
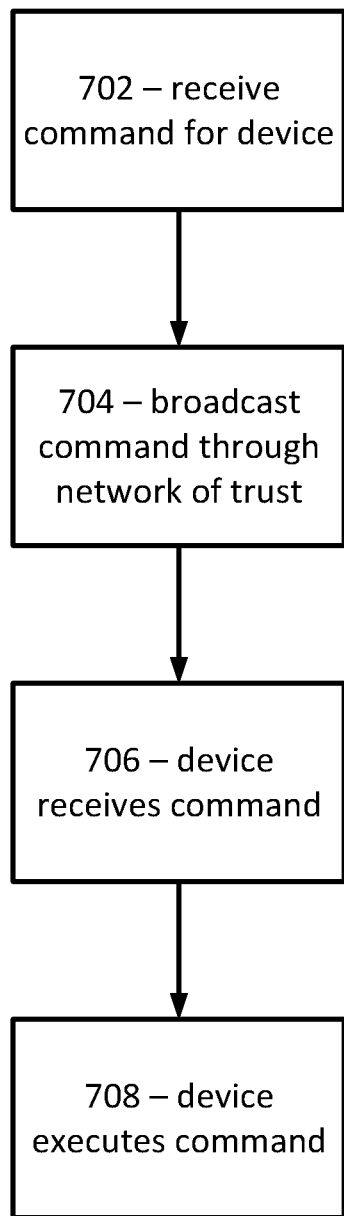
FIG. 7 shows a network of trust command exchange and execution process according to an embodiment of the present disclosure.

FIG. 7 shows a network of trust command exchange and execution process 700 according to an embodiment of the present disclosure. Process 700 may be performed by a plurality of devices 112/114 within a network of trust (e.g., as established by devices 112/114 among one another using process 400 or other methods). Process 700 may propagate a command for one of the devices 112/114 (e.g., a missing or stolen device 112/114) to travel through the network of trust until the device 112/114 is found, at which point the device 112/114 may execute the command. In the following example, external device 114 may broadcast the command, and user device 112 may execute the command, for ease of illustration.

At 702, external device 114 may receive a command intended for user device 112. The command may have originated with server device 102 in some embodiments. Server device 102 may send the command received at 702 through a network 100 connection (e.g., as data pushed to a financial application on external device 114 or as some other type of message). Accordingly, external device 114 may receive the command from server device 102 through a transmission from server device 102 in some cases. In other cases, a different external device 114 may have sent the command to external device 114 (e.g., in a manner described at 704 below).

At 704, external device 114 may broadcast the command received at 702 through the network of trust. For example, the command may include at least a set of instructions to be executed by a device and an indication of the device's identity (e.g., an identifier associated with device 112, which may include a serial number of the device, a media access control (MAC) address of the device, an account identifier associated with the device, etc.). External device 114 may examine the command and determine that the command is not intended for external device 114. External device 114 may identify other devices 112/114 within its network of trust (e.g., by performing process 400 or a similar process) and may send the command to the other devices 112/114 within the network of trust. External device 114 may send the command to any and/or all identified devices (e.g., not merely sending only to the intended recipient device).

Any number of devices may repeat 702 and 704 until the command reaches the intended device (e.g., user device 112 in this example). At 706, user device 112 may receive the command from another device 114 within its network of trust (e.g., established by performing process 400 or a similar process). User device 112 may examine the command and determine that the command is intended for user device 112.

At 708, user device 112 may execute the command received at 706. Due to the trusted nature of the device 114 from which the command was received, user device 112 may be able to execute it with assurances of its authenticity and/or security. This may allow transmission and execution of sensitive commands such as "kill" commands configured to disable functionality of user device 112. The command may be a kill command because user device 112 may be lost or stolen, as noted above, and the kill command may protect sensitive data thereon. Other command examples may include commands to send the whereabouts of user device 112 to server device 102 or an emergency authority, or any other type of command.

Figure 8:
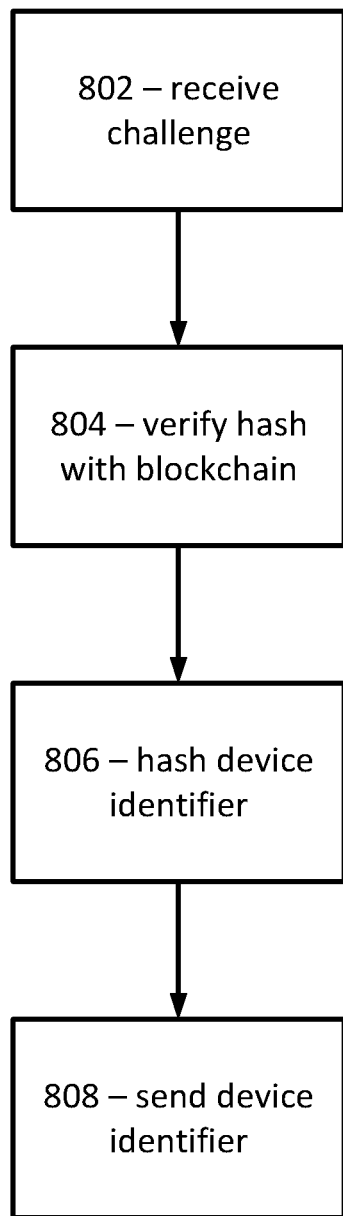
FIG. 8 shows an identity securing process according to an embodiment of the present disclosure.

FIG. 8 shows an identity securing process 800 according to an embodiment of the present disclosure. In some embodiments, user device 112 and/or external devices 114 may leverage blockchain-based records to provide identity verification for establishing the network of trust. Accordingly, user device 112 and/or external devices 114 may perform process 800 within process 400 (and therefore within one or more of processes 500, 600, 700 and/or any other processes using a network of trust, such as those described in U.S. patent application Ser. No. 15/909,091). For example, user device 112 may perform process 800 at 404 and/or 406 of process 400.

At 802, user device 112 may receive a challenge from external device 114. The challenge may include information identifying the sending external device 114. For example, the identifying information may include a unique hashed value associated with the external device 114 and/or associated with an account associated with the external device 114. In some embodiments, the identifying information may be a hash derived from a block in a transaction ledger stored in a blockchain accessible to user device 112. For example, the blockchain may be hosted by server device 102 (e.g., stored in transaction database 106); the blockchain may be distributed among user device 112, external device 114, and/or other devices; or a combination thereof. The blockchain may be used to store any type of data, such as financial transactions or smart contracts. The challenge may also identify the block in some embodiments.

At 804, user device 112 may verify the hashed value in the challenge received at 802. For example, user device 112 may examine the blockchain to identify the block indicated in the challenge. User device 112 may evaluate the block to determine whether the external device 114 from which the challenge was received and/or an account associated with the external device 114 from which the challenge was received was a party to a transaction recorded in the block. For example, user device 112 may generate a hash of a device identifier in the block to determine whether it matches the hashed value received at 802. If the hash from the block and the hash from the challenge match, user device 112 may verify that the hash is genuine (e.g., that it came from the correct device, which may be the same external device 114 that was a party to the transaction in the block). If there is not a match, user device 112 may determine that the challenge is possibly fraudulent or erroneous and may refuse to respond (e.g., thereby ending process 800).

At 806, user device 112 may prepare a response to the challenge received at 802. For example, user device 112 may hash its own device identifier associated with a block in the blockchain. User device 112 may include the hash and/or information identifying the block in the response.

At 808, user device 112 may send the response prepared at 806 to external device 114. As noted above with respect to process 400, external device 114 may verify the response in some embodiments. This may include checking the hash of user device 112 performing similar processing to that performed by user device 112 at 802-804, for example. If both devices 112/114 mutually verify one another, they may consider one another as fellow members of the network of trust and may perform network of trust processing described herein.

Figure 9:
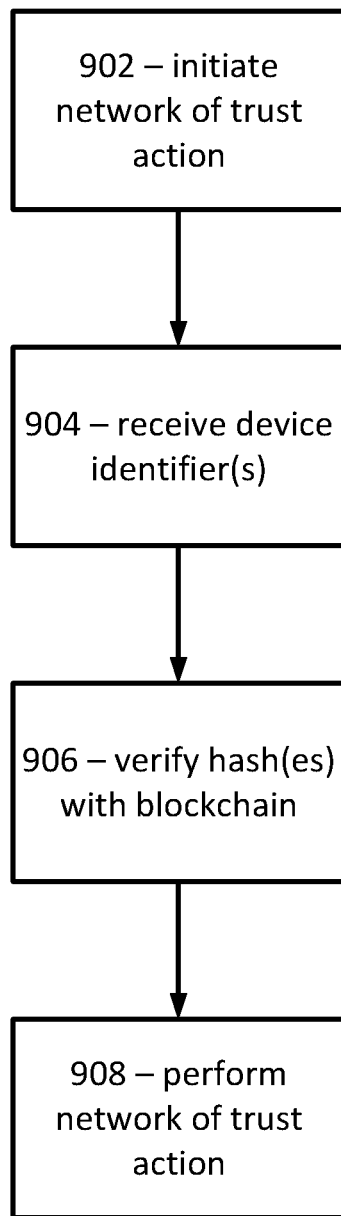
FIG. 9 shows a verification and response process according to an embodiment of the present disclosure.

FIG. 9 shows a verification and response process 900 according to an embodiment of the present disclosure. Process 900 may represent an integration of process 800 into a generic process using the network of trust. As such, user device 112 and/or external device 114 may perform process 900 as part of, or in conjunction with, any of processes 500, 600, 700 and/or any other processes using a network of trust, such as those described in U.S. patent application Ser. No. 15/909,091.

At 902, user device 112 may initiate a network of trust action, such as one or more of the processes described above or elsewhere. For example, user device 112 may attempt a bill splitting process (e.g., process 500/600), a command sharing process (e.g., process 700), or a standard transaction with added security indicators provided (e.g., see U.S. patent application Ser. No. 15/909,091).

At 904, user device 112 may receive one or more device identifiers of external device(s) 114 with which user device 112 may be coordinating to perform the network of trust action. The identifiers may include hashed data as described above with respect to process 800. At 906, user device 112 may verify the hashed data as described above in process 800.

At 908, user device 112 may perform any steps of the network of trust action that may follow connection with and/or verification of other devices in the network of trust. For example, in the bill splitting process, user device 112 may coordinate with verified devices to split the bill (e.g., sending requests to verified devices at 506 and/or generating transaction requests at 606). In another example involving the command sharing process, user device 112 may execute the command only after establishing the network of trust, including verifying the device(s) in the network of trust from which the command was received. In sum, any process wherein a network of trust is established may be enhanced through the use of blockchain verification as described above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A user device comprising:
a processor;
a wireless transceiver in communication with the processor; and
a non-transitory memory storing instructions that, when executed by the processor, cause the processor to perform processing comprising:
  receiving, by the wireless transceiver, a command in a broadcast message sent by at least one member of a network of trust of which the user device is also a member due to performing a process comprising:
    sending, through the wireless transceiver, a challenge to one of a plurality of devices that is a member of the network of trust;
    receiving, through the wireless transceiver, a second user device identifier from the one of the plurality of devices in response to the challenge;
    receiving, through the wireless transceiver, a second challenge from the one of the plurality of devices;
    generating a response to the second challenge, the generating comprising inserting information uniquely identifying the user device into the response;
    sending, through the wireless transceiver, the response to the one of the plurality of devices in response to the second challenge;
    receiving, through the wireless transceiver, a second response generated after receiving the second user device identifier from the one of the plurality of devices;
    in response to receiving the second user device identifier, extracting information about the one of the plurality of devices from the second response and locally storing the information about the one of the plurality of devices in a local set of a plurality of member devices maintained in local memory; and
    in response to identifying the information about the one of the plurality of devices in the local set of the plurality of member devices maintained in local memory, joining the network of trust; and
  executing the command.

2. The device of claim 1, wherein the processing further comprises determining at least one of the members of the network of trust.

3. The device of claim 2, wherein the determining comprises:
detecting, by the wireless transceiver, at least one external device;
sending, by the wireless transceiver, a challenge to the at least one external device in response to the detecting; and
receiving, by the wireless transceiver, the at least one external device identifier in response to the challenge.

4. The device of claim 2, wherein the determining comprises receiving information identifying at least a portion the members of the network of trust from a data source.

5. The device of claim 1, wherein executing the command includes disabling at least one function of the user device.

6. A method comprising:
receiving, by a wireless transceiver of a user device, a command in a broadcast message sent by at least one member of a network of trust of which the user device is also a member due to performing a process comprising:
  sending, through the wireless transceiver, a challenge to one of a plurality of devices that is a member of the network of trust;
  receiving, through the wireless transceiver, a second user device identifier from the one of the plurality of devices in response to the challenge;
  receiving, through the wireless transceiver, a second challenge from the one of the plurality of devices;
  generating a response to the second challenge, the generating comprising inserting information uniquely identifying the user device into the response;
  sending, through the wireless transceiver, the response to the one of the plurality of devices in response to the second challenge;
  receiving, through the wireless transceiver, a second response generated after receiving the second user device identifier from the one of the plurality of devices;
  in response to receiving the second user device identifier, extracting information about the one of the plurality of devices from the second response and locally storing the information about the one of the plurality of devices in a local set of a plurality of member devices maintained in local memory; and
  in response to identifying the information about the one of the plurality of devices in the local set of the plurality of member devices maintained in local memory, joining the network of trust; and
executing, by a processor of the user device, the command.

7. The method of claim 6, further comprising determining, by the processor, at least one of the members of the network of trust.

8. The method of claim 7, wherein the determining comprises:
detecting, using the wireless transceiver, at least one external device;
sending, by the wireless transceiver, a challenge to the at least one external device in response to the detecting; and
receiving, by the wireless transceiver, the at least one external device identifier in response to the challenge.

9. The method of claim 7, wherein the determining comprises receiving information identifying at least a portion the members of the network of trust from a data source.

10. The method of claim 6, wherein executing the command includes disabling at least one function of the user device.

11. A non-transitory computer-readable medium storing instructions that, when executed by a processor of a user device, cause the processor to perform processing comprising:
receiving, by the wireless transceiver, a command in a broadcast message sent by at least one member of a network of trust of which the user device is also a member due to performing a process comprising:
  sending, through the wireless transceiver, a challenge to one of a plurality of devices that is a member of the network of trust;

receiving, through the wireless transceiver, a second user device identifier from the one of the plurality of devices in response to the challenge;

receiving, through the wireless transceiver, a second challenge from the one of the plurality of devices;

generating a response to the second challenge, the generating comprising inserting information uniquely identifying the user device into the response;

sending, through the wireless transceiver, the response to the one of the plurality of devices in response to the second challenge;

receiving, through the wireless transceiver, a second response generated after receiving the second user device identifier from the one of the plurality of devices;

in response to receiving the second user device identifier, extracting information about the one of the plurality of devices from the second response and locally storing the information about the one of the plurality of devices in a local set of a plurality of member devices maintained in local memory; and in response to identifying the information about the one of the plurality of devices in the local set of the plurality of member devices maintained in local memory, joining the network of trust; and executing the command.

12. The non-transitory computer-readable medium of claim 11, wherein the processing further comprises determining at least one of the members of the network of trust.

13. The non-transitory computer-readable medium of claim 12, wherein the determining comprises:

detecting, by the wireless transceiver, at least one external device;

sending, by the wireless transceiver, a challenge to the at least one external device in response to the detecting; and receiving, by the wireless transceiver, the at least one external device identifier in response to the challenge.

14. The non-transitory computer-readable medium of claim 12, wherein the determining comprises receiving information identifying at least a portion the members of the network of trust from a data source.

15. The non-transitory computer-readable medium of claim 11, wherein executing the command includes disabling at least one function of the user device.

* * * * *